United States Patent [19]
Meyer

[11] Patent Number: 5,457,359
[45] Date of Patent: Oct. 10, 1995

[54] CONTROL FOR ELECTROLUMINESCENT LOADS

[75] Inventor: Steven D. Meyer, Snohomish, Wash.

[73] Assignee: Olin Corporation, Redmond, Wash.

[21] Appl. No.: 390,153

[22] Filed: Feb. 16, 1995

Related U.S. Application Data

[63] Continuation of Ser. No. 103,018, Aug. 6, 1993, abandoned.

[51] Int. Cl.$^6$ .................................................. H05B 33/08
[52] U.S. Cl. ........................ 315/194; 315/169.3; 315/307
[58] Field of Search ..................................... 323/320, 905; 307/239, 248; 315/194, 307, 291, 169.3

[56] References Cited

U.S. PATENT DOCUMENTS

| | | | |
|---|---|---|---|
| 2,897,405 | 7/1959 | Briggs et al. | 315/169.3 |
| 3,521,123 | 7/1970 | Armstrong et al. | 315/194 |
| 3,684,919 | 8/1972 | Cramer | 315/194 |
| 5,323,305 | 6/1994 | Ikeda et al. | 315/169.3 |

OTHER PUBLICATIONS

G.E. SCR Manual 3rd Ed. 1964 pp. 123–124 Made Available to Public on Mar. 23, 1964.

Primary Examiner—Benny Lee
Assistant Examiner—Michael B. Shingleton
Attorney, Agent, or Firm—Gregory S. Rosenblatt

[57] ABSTRACT

A control for an electroluminescent panel which utilizes a resonant switch, preferably comprising two silicon-controlled rectifiers mounted anti-parallel. The amplitude of the output voltage of the resonant switch going the panel is changed by changing the voltage at which the switch is turned on. The voltage in the panel is resonated from one polarity through zero to the opposite polarity.

6 Claims, 4 Drawing Sheets

5,457,359

CONTROL FOR ELECTROLUMINESCENT LOADS

This application is a continuation of application Ser. No. 08/103,018 filed Aug. 6, 1993, now abandoned.

BACKGROUND OF THE INVENTION

This invention relates generally to the control of electroluminescent loads. More particularly, this invention relates to a resonant switch phase control for dimming control of electroluminescent loads.

Electroluminescent loads such as electroluminescent lamps in the shape of a panel can be used to provide a source of illumination in many instances. Such electroluminescent (EL) lamps or panels generally consist of transparent conductive electrodes separated by a dielectric containing a luminescent phosphor. The amount of illumination provided by a panel or lamp is determined by the voltage across the layer and the frequency applied to it.

One application of electroluminescent panels is in the aircraft field wherein such panels are used to illuminate the entrance for the prod used in mid air aircraft refueling and also to provide illumination of the aircraft during formation flying for visual sighting by other pilots in the formation.

In this application, it is necessary that the EL panels can be dimmed reliably to suit the particular conditions and to minimize the possibility of a rise in illumination when not desired. Such EL panels are connected to a power source within the aircraft which is generally 115 volts, 400 Hz power. Proper control of the voltage to the EL panel is necessary to ensure that the proper level of illumination is obtained at a particular time. During certain conditions, such as night formation flying where there may be the presence of hostile forces, maximum illumination is not desirable. Accordingly, such a circuit should be provided with a dimming control.

Additionally, the input voltage from the aircraft may vary so that without proper control, the voltage to the EL lamp may drop, resulting in a loss of illumination or, if the particular desired illumination is relatively low, requiring a low voltage input, the illumination from the EL lamp may increase at an inappropriate time due to an unexpected increase in the input voltage.

SUMMARY OF THE INVENTION

In view of the above, it is an object of the present invention to provide a dimming control system for electroluminescent loads.

More specifically, it is an object of the present invention to provide a dimming control for electroluminescent loads which compensates for changes in input voltage to provide a constant voltage to the EL load.

It is another object of the present invention to provide a control for electroluminescent lamps in which the output voltage is able to exceed the input voltage without the necessity of a voltage boosting transformer.

These and other objects of the present invention may be accomplished through the provision of a control for an electroluminescent panel comprising a resonant switch having an input for connection to a power source and an output for connection to the electroluminescent panel; said switch being turned on by drive pulses and turned off at zero current. Means are provided for changing the amplitude of the output voltage of the resonant switch going to the electroluminescent panel by changing the voltage at which the switch is turned on. Means are also provided for causing the voltage on the electroluminescent panel to resonate from one polarity through zero to the opposite polarity.

BRIEF DESCRIPTION OF DRAWING

This invention may be more readily understood by reference to the following description and the accompanying drawings in which.

DETAILED DESCRIPTION

Figure 1:
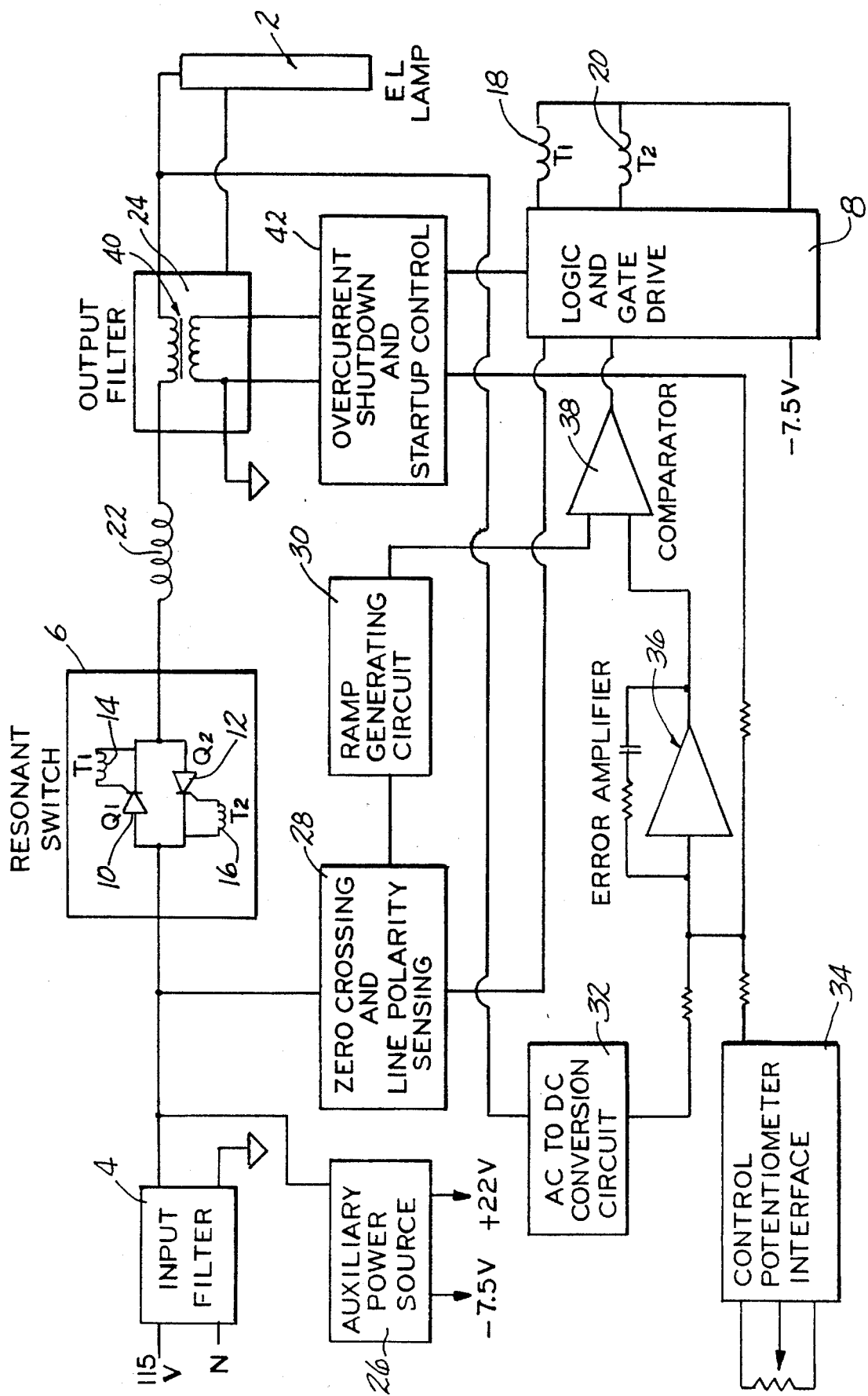
FIG. 1 is a flow diagram of a circuit for control of illuminescent panels constructed in accordance with the present invention.
Figure 2:
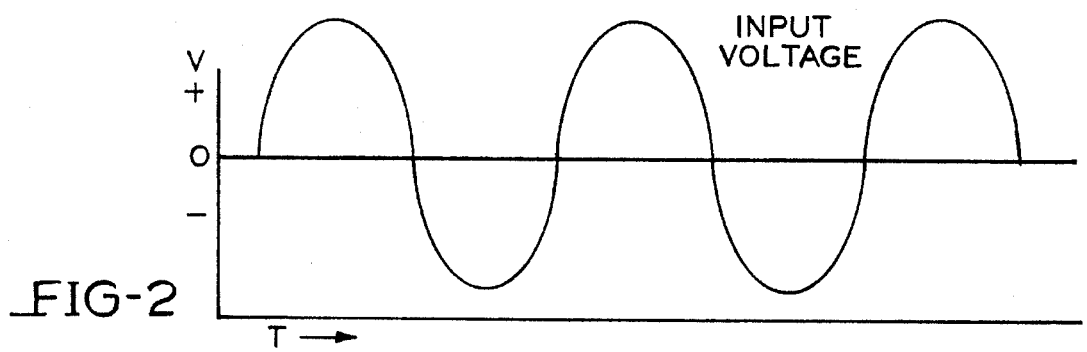
FIG. 2 is a voltage-time plot of the wave form of the input voltage.

Referring to the drawings, and in particular FIG. 1, there is shown a block diagram of the control system for the control of electroluminescent load 2 such as an electroluminescent (EL) lamp. As shown in FIG. 1, the input power to the EL lamp 2, which in the present case may be 115 volt, 400 Hz, having a sinusoidal waveform of the type shown in FIG. 2, passes through an input filter 4 which provides for both differential or normal mode filtering and common mode filtering. The output from the input filter 4 passes to a resonant switch 6 which is driven by drive signals from the logic and gate drive 8.

The resonant switch 6 is a switch that is turned on by command and turns off at zero current. According to the preferred embodiment, two silicon-controlled rectifiers (SCRs) 10 and 12, connected in anti-parallel in the input line after the input filter 4 are used to implement the resonant switch. Secondary windings 14 and 16 of transformers $T_1$ and $T_2$ are connected between the gates and cathodes of the SCR's 10 and 12 respectively. The primary windings 18 and 20 of the transformer $T_1$ and $T_2$ respectively receive the drive signals from the logic and gate drive 8.

The output from the resonant switch 6 passes through a resonant inductor 22 and output filter 24 which also provides for both differential or normal mode filtering and common mode filtering. The output from the output filter 24 is connected to the EL panel or lamp 2 as shown.

The output filter capacitance and the natural EL load capacitance form a resonant capacitance which resonants with the resonant inductor 22 to transfer power to the EL load 2.

Control power for the control electronics is provided by an auxiliary power source circuit 26 which has an input from the input line to the resonant switch 6. The auxiliary power source circuit 26 serves to provide a +22 volt auxiliary voltage and a −7.5 volt voltage for providing power for the control of various devices within the circuit assembly.

Figure 3:
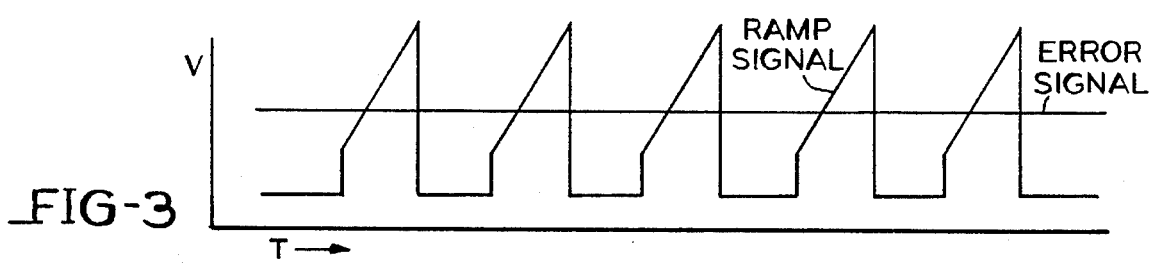
FIG. 3 is a plot of the output signals from the ramp circuit and error amplification circuit superimposed upon each other.

The phase control used to change the resonant switch turn-on phase to adjust the output from the resonant switch 6 is accomplished by passing the input signal to a zero crossing and line polarity sensing circuit 28 which produces a signal indicative of the point of time at which the wave of the input voltage crosses zero and also an indication of whether the voltage is going negative or positive. These signals from the zero crossing and line polarity sensing circuit 28 are passed to a ramp generating circuit 30 which produces a ramp signal as shown in FIG. 3 having a sloping portion coinciding with the lagging half of the positive portion of the wave form of the input voltage and with the lagging half of the negative portion of the wave form input voltage. The zero crossing circuit 28 serves to reset the ramp at the start of each cycle.

An error signal is obtained by taking a signal from the input to the EL load 2 and passing it to an AC to DC conversion circuit 32 which rectifies the output voltage to provide a DC signal which is a negative representative of the root mean square value of the input voltage to the EL load 2.

Figure 4:
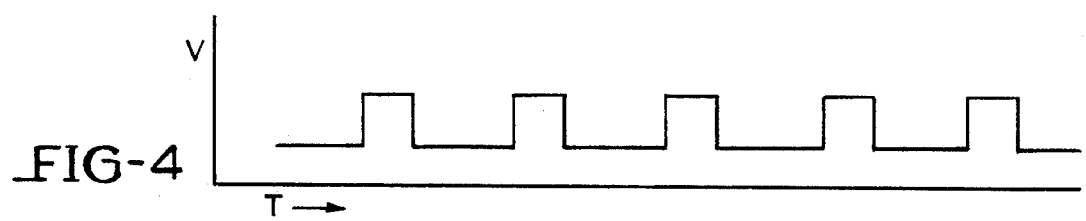
FIG. 4 is a voltage-time plot of the wave form of the output of the phase control comparator.
Figure 5:
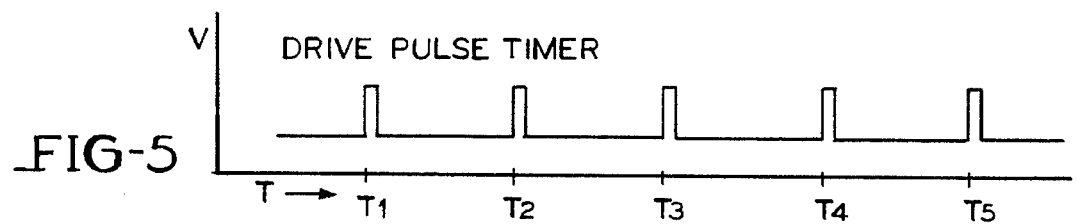
FIG. 5 is a voltage time plot of the drive pulse timer.
Figure 6:
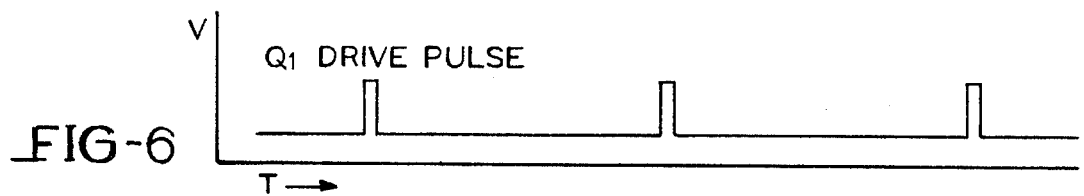
FIG. 6 is a voltage time plot of the drive pulse for one of the silicon-controlled rectifiers of the resonant switch.
Figure 7:
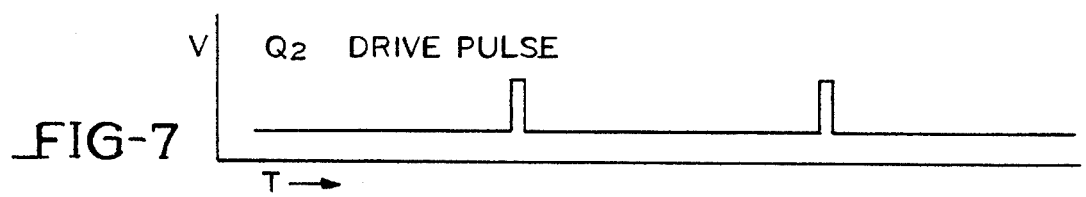
FIG. 7 is a voltage time plot of the drive pulse for the second silicon-controlled rectifier of the resonant switch.

A control potentiometer interface 34 generates a DC voltage signal corresponding to the commanded panel voltage determined from the position of the control potentiometer. The commanded panel voltage is representative of the desired brightness of the EL lamp and is a 0 to 3 volt level output. The output from the control potentiometer interface 34 is compared with the representation of the actual input voltage from the output from the AC to DC conversion circuit 32 by an amplifier 36 which generates an error signal. A comparator 38 compares the amplitude of the error signal with the amplitude of the sloping portion of the ramp of the ramp signal and produces an output signal as shown in FIG. 4. The comparator output signal is turned on at the point at which the error amplification signal coincides with the sloping portion of the ramp signal as indicated by FIGS. 3 and 4. This signal is in turn transmitted to the logic and gate drive 8 in which a one shot pulse timer is activated upon each positive signal from the comparator 38 providing a wave form as shown in FIG. 5. Logic circuits within the logic and gate drive 8 causes the output drive pulse to alternate between output drives $T_1$ and $T_2$ with SCR 10 being activated during the positive portion of the input voltage and SCR 12 being activated during the negative portion of the input voltage as shown in FIGS. 6 and 7. The outputs $T_1$ and $T_2$ of the logic and gate drive represents the primary windings of transformers coupled with the secondary windings to Q1 and Q2 respectively of the resonant switch 6, attached to the gates of the SCR's.

A current transformer 40 mounted within the circuit comprising the output filter 24 is used to sense the dimmer output current and provide an indication thereof to an overcurrent shutdown and startup control circuit 42. The overcurrent shutdown and startup control circuit 42 serves to shut the dimmer down for an overcurrent and maintain it in an off condition for a limited period of time to limit thermal stress. The overcurrent shutdown control also provides the function of a power-on reset and slow starting of the output to reduce inrushing current and avoid overshoot in the dimmer output voltage. The overcurrent and shutdown control 42, as shown in FIG. 1, has an output to both the logic and gate drive 8 and the error amplifier 36 for providing those functions.

Figure 10:
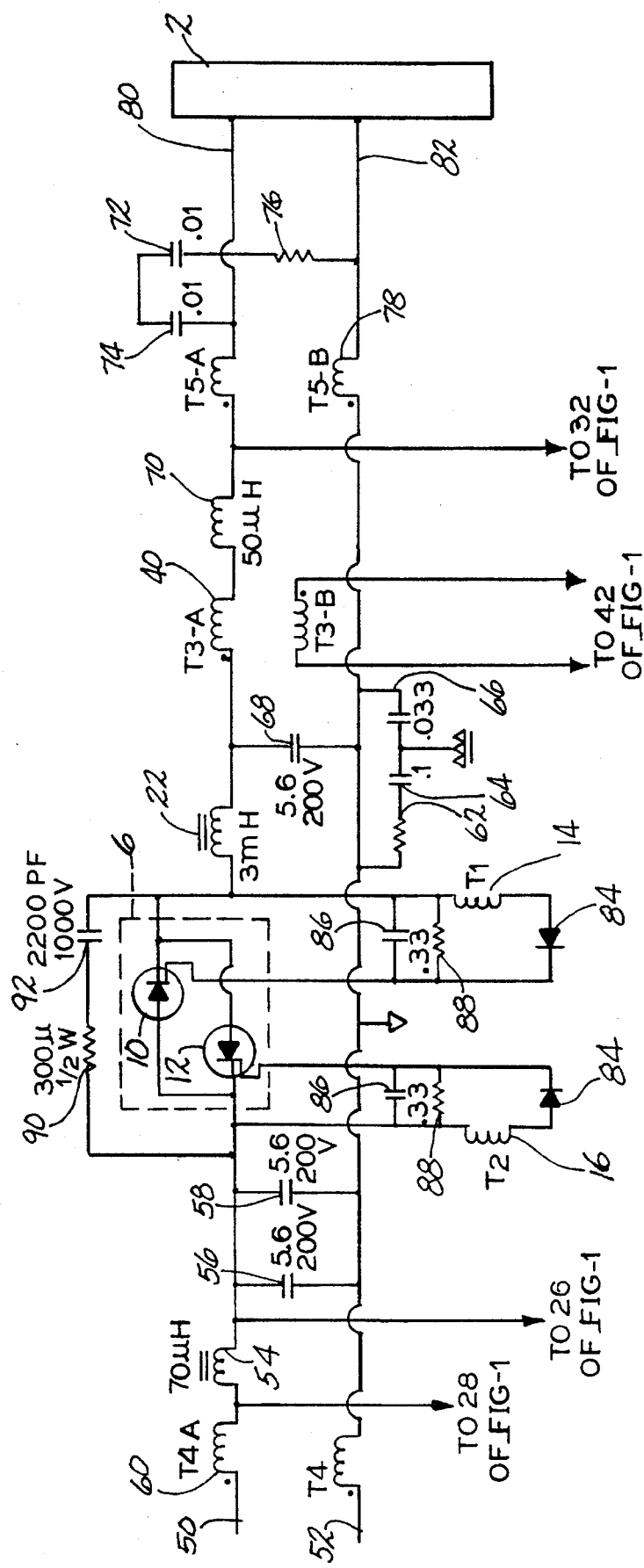
FIG. 10 is a schematic diagram of the circuit elements of the power stage of the control.

FIG. 10 is a schematic diagram of the circuit components of the power stage of the control system. All capacitor values are in microfarads and resistor values are in ohms. Referring to FIG. 10, the terminals 50 and 52 are connected to a power source. Terminal 50 provides an input while terminal 52 provides a return. The input filter 4 (as represented in the block diagram of FIG. 1) includes an input differential mode filtering for electromagnetic interference consisting of inductor 54 in series and capacitors 56 and 58 in parallel as shown, positioned before the resonant switch 6. The input common mode electromagnetic interference filtering is achieved by the balun 60 with the primary winding in the line 50 and the secondary winding in the line 52, along with the capacitor 66 and the damping network of resistor 62 and capacitor 64.

On the output side of the switch 6, the electromagnetic interference filtering is accomplished by the resonant inductor 22 and the filtering of the capacitor 68 and the inductor 70. High frequency damping is provided by capacitors 72 and 74 and resistor 76 mounted as shown. Common mode filtering is provided by the output balun or transformer 78 and the same common mode elements used by the input filter (capacitor 66 and the damping network of resistor 62 and capacitor 64). The outputs 80 and 82 are connected to the EL lamp 2 as shown.

Figure 8:
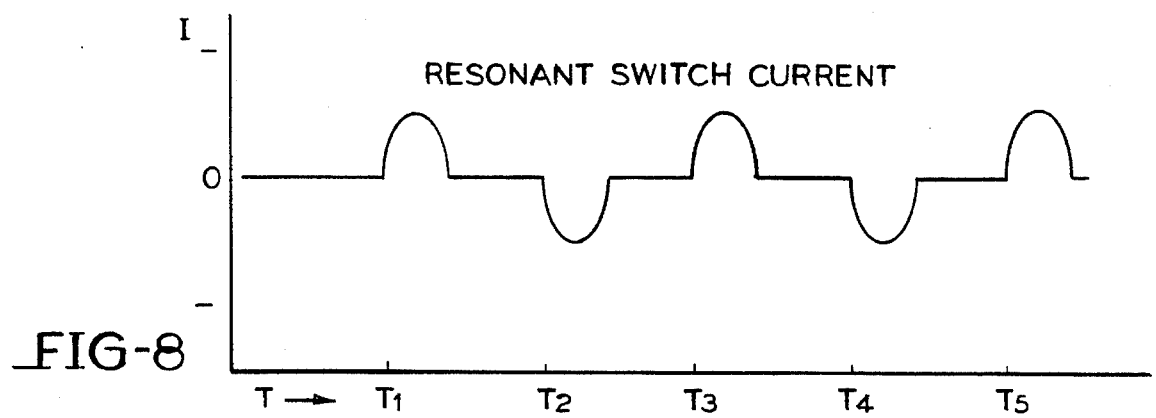
FIG. 8 is a current-time plot of the resonant switch current.

The resonant switch 6 includes the two silicon-control rectifiers (SCR) 10 and 12 mounted anti parallel in input line 30. The upper SCR 10 as shown in FIG. 8 has its anode connected to the input side of the switch and its cathode connected to the output side. The lower SCR 12 has its cathode connected to the input side of the switch and its anode connected to output side.

The gate of SCR 10 is connected to the secondary winding 14 of the transformer $T_1$ and the gate of the SCR 14 is connected to the secondary winding 16 of a transformer $T_2$ through the diodes 84 associated with each of the secondary windings. The diodes 84 cause the transformers $T_1$ and $T_2$ to reset. The capacitors 86 and resistors 88, associated with each of the windings provide a low impedance on the respective gates to avoid false dv/dt turn-on of the SCR. The snubber loop containing resistor 90 and capacitor 92 also reduces the dv/dt seen by the SCR to prevent false turn-on. The dv/dt is caused by the SCRs turning off at a holding current above zero.

Figure 9:
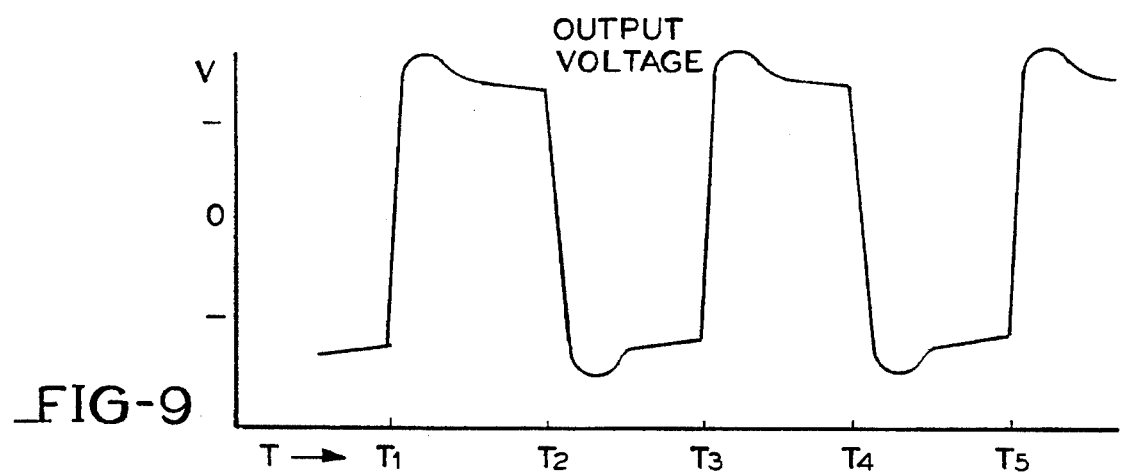
FIG. 9 is a voltage-time plot of the output voltage from the output filter to the EL load or panel.

The power transfer to change the voltage on the EL lamps 2 is accomplished by using a resonant energy transfer. This approach works well with the lamps because they are highly capacitive. The combined capacitance of the EL panel lamp 2 and the output filter capacitance is resonated with the resonant inductor 22. The output current supplied to the lamp is a half sine wave resonant pulse as shown in FIG. 8. This current pulse causes the voltage on the EL panel to resonate from one polarity, through zero to the opposite polarity as shown in FIG. 9. The amplitude of the output voltage is changed by changing the voltage at which the resonant switch is turned on. This is accomplished by phase control of the resonant switch by varying the SCR firing time.

For low output voltages, the SCR's are turned on at the end of the cycle near the zero crossing. The SCR's turn off naturally when the current drops below the holding current. For increasing brightness the turn on point is advanced up the input waveform. This causes increased drive to the resonant circuit and consequently a higher output voltage to the EL load and greater illumination. For decreasing brightness, the turn on point is retarded toward the zero crossing.

Control is initiated through the potentiometer interface 34. When increasing brightness is desired, the potentiometer setting is changed. A signal from the potentiometer interface 34 indicative of the new power voltage is compared with the representation of the actual voltage from the AC to DC conversion circuit 32 by the error amplifier 36. The error signal from the amplifier 36 is then compared with the ramp signal from the ramp operating circuit 30. An increase in the amplitude of the signal from the control potentiometer interface (indicating the desire for increased brightness) when compared with the negative representation of the input voltage to the lamp 2 will reduce the absolute value of the amplitude of the error signal, to the comparator 38. The error signal as shown in FIG. 3 will move downwardly resulting in the phase control comparator signal to turn on earlier. This causes the drive pulse timing signal to also turn on earlier resulting in the drive pulses to the resonant switch being turned on at a point earlier in the cycle and advanced up the input wave form. When the potentiometer setting is changed so that decreasing brightness is desired, the comparison of the signal from the potentiometer interface 34 at the signal from the AC to DC conversion circuit 32 will result in the amplitude of the error signal to increase causing the drive pulse to the SCR to be retarded toward the zero crossing-point of the input voltage, thereby reducing the output voltage from the switch to the EL load.

The above described feed back system also compensates for variation in line voltage. With the control potentiometer interface 20 set to a given power level to cause a certain level of illumination of EL lamp 2, when the system voltage drops, thereby not providing enough power to illuminate the EL lamp to its desired brilliance, an error signal representative of the difference between the current system voltage to the load and the needed voltage as determined by the potentiometer interface is generated at the output of the error amplifier 36. This signal decreases in amplitude, so that it crosses the ramp portion of the ramp signal at an earlier point in time of the cycle. This results in the phase control signal of FIG. 4, turning on at an earlier time in the cycle with the result that the drive pulse timer signal of FIG. 5 is initiated earlier in the cycle to cause the drive pulses to $T_1$ and $T_2$ to turn on at a point advanced up the input waveform. This causes increased drive to the resonant circuit (inductor 22, together with capacitor 68 and the capacitance of the load 2 as shown in FIG. 10) and consequently a higher output voltage.

While the invention has been described in combination with a specific embodiment, it is evident that many alternatives, modifications and variations will be apparent to those skilled in the art in light of the foregoing description. Accordingly, it is intended to embrace all such alternatives, modifications and variations as fall within the spirit and broad scope of the appended claims.

What is claimed:

1. A control circuit for an electroluminescent panel, comprising:
   a) a resonant switch having an input connected to a power source and an output connected to the electroluminescent panel, said switch being turned on by drive pulses from a logic and gate drive and turned off at zero current;
   b) an inductor in series with said electroluminescent panel wherein the parallel capacitance of said electroluminescent panel and an output filter capacitance resonates with the inductance of said inductor;
   c) means for controllably changing the amplitude of the output voltage of the resonant switch going to the electroluminescent panel to obtain a desired level of illumination by changing the voltage at which the switch is turned on; and
   d) means for causing the voltage on the electroluminescent panel to resonate from one polarity through zero to the opposite polarity, 2. The control circuit of claim 1 wherein said resonant switch includes two silicon-controlled rectifiers mounted anti-parallel.

3. The control of claim 2 wherein the means for changing the output voltage from said switch to said panel comprises means for comparing a signal indicative of the actual voltage going to said panel with a signal indicative of the required voltage needed for a given illumination of the panel and generating an error signal indicative of the difference between the two signals, said error signal having a lower amplitude when more voltage is needed and greater amplitude when less voltage is needed, means for comparing said error signal with a ramp signal having a sloping portion corresponding to the lagging half of the positive and negative portions of the wave form of the input voltage to the switch, and means for generating a signal at the point in said cycle said error signal intersects said sloping portion of said ramp signal to cause a drive pulse to be sent to said switch.

4. The control circuit of claim 3 wherein said input voltage is about 115 volts AC and the output voltage varies in response to a control potentiometer.

5. The control circuit of claim 4 wherein said control potentiometer generates a dc voltage signal to activate said silicon-controlled rectifiers of said resonant switch.

6. The control circuit of claim 5 wherein said output filter is a transformer preventing overcurrent from reaching said electroluminescent panel.

\* \* \* \* \*